(12) United States Patent
Xie et al.

(10) Patent No.: US 8,465,326 B1
(45) Date of Patent: Jun. 18, 2013

(54) CARD CONNECTOR

(75) Inventors: Bao-Geng Xie, Guang-Dong (CN);
Wei-Hong Liao, Guang-Dong (CN);
Yin-Lung Wu, New Taipei (TW);
Ming-Chiang Chen, New Taipei (TW)

(73) Assignee: Cheng UEI Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/434,842

(22) Filed: Mar. 29, 2012

(51) Int. Cl.
*H01R 24/00* (2011.01)
(52) U.S. Cl.
USPC .................... 439/630; 439/607.33
(58) Field of Classification Search
USPC ................. 439/607.31–607.35, 607.22, 630, 439/945
See application file for complete search history.

(56) References Cited

U.S. PATENT DOCUMENTS

| | | | | |
|---|---|---|---|---|
| 7,661,989 B1* | 2/2010 | He et al. | .................... | 439/607.33 |
| 7,682,194 B2* | 3/2010 | Lin et al. | .................. | 439/607.31 |
| 7,914,330 B2* | 3/2011 | Su et al. | .................... | 439/607.31 |
| 8,109,772 B2* | 2/2012 | Lin | .............. | 439/76.1 |
| 8,287,293 B1* | 10/2012 | Gao et al. | ...................... | 439/159 |

\* cited by examiner

*Primary Examiner* — Khiem Nguyen
(74) *Attorney, Agent, or Firm* — Cheng-Ju Chiang

(57) ABSTRACT

A card connector includes a first insulating housing, a second insulating housing mounted above the first insulating housing, a plurality of electrical terminals assembled in the first insulating housing and the second insulating housing, and a shielding shell enclosing the first and the second insulating housings. The first insulating housing defines a first receiving room and a second receiving room abreast arranged with each other, and the second insulating housing defines a third receiving room located over the first and the second receiving rooms. So the card connector forms a structure combining a juxtaposition arrangement and a stratiform arrangement for the receiving rooms to reduce the space occupied by the card connector on an external circuit board. Such structure contributes to the miniaturization of digital products.

6 Claims, 3 Drawing Sheets

CARD CONNECTOR

BACKGROUND OF THE INVENTION

1. Field of the Invention

The present invention relates to a card connector, and more particularly to a card connector capable of receiving multiple cards.

2. The Related Art

A traditional card connector includes an insulating housing, a plurality of terminals assembled in the insulating housing respectively, and a shielding shell enclosing the insulating housing therein. The insulating housing defines two receiving rooms to accommodate two SIM cards or a SIM card and a SD card therein, with a stratiform structure. However, that the card connector accommodates only two cards can not meet the actual use requirements of the customers. So, an improved card connector capable of simultaneously receiving more than two cards comes with the tide of fashion. But when the improved card connector is also designed with the stratiform structure to receive more than two cards simultaneously, it would lead to the expansion of the size of the card connector and fail to comply with the miniaturization development direction of electronic products.

SUMMARY OF THE INVENTION

Accordingly, an object of the present invention is to provide a card connector. The card connector includes a first insulating housing with a first receiving room and a second receiving room being abreast opened in a top thereof along a transverse direction and each penetrating through a front surface thereof. The first insulating housing defines a plurality of first terminal grooves and second terminal grooves arranged in the first receiving room and the second receiving room respectively. A second insulating housing has a third receiving room transversely opened in a top thereof and penetrating through a front thereof, and at least one receiving cavity opened in a bottom thereof. A pair of side walls protrudes downward at two opposite ends of the second insulating housing. The second insulating housing defines a plurality of through holes each vertically penetrating therethrough to connect between the receiving cavity and the third receiving room. Two opposite longitudinal sidewalls of the receiving cavity are transversely concaved towards the corresponding side walls to form a plurality of positioning passages. A plurality of electrical terminals includes a plurality of first terminals each assembled in the corresponding first terminal groove with a contact portion thereof elastically projecting upward in the first receiving room, a plurality of second terminals each assembled in the corresponding second terminal groove with a contact arm thereof elastically projecting upward in the second receiving room, and a plurality of third terminals each disposed in the second insulating housing with a touching portion thereof stretching in the receiving cavity and further projecting into the third receiving room through the corresponding through hole. A portion of each third terminal which connects with the touching portion is positioned in the corresponding positioning passage. A shielding shell encloses the first and the second insulating housings, after the second insulating housing is covered on the first insulating housing by the side walls clamping the first insulating housing therebetween to make the third receiving room located over the first and the second receiving rooms.

As described above, the first receiving room and the second receiving room are abreast opened in the top of the first insulating housing along the transverse direction, and the third receiving room is transversely opened in the top of the second insulating housing and located over the first receiving room and the second receiving room, so the card connector forms a structure combining a juxtaposition arrangement and a stratiform arrangement for the receiving rooms to reduce the space occupied by the card connector on an external circuit board. Such structure contributes to the miniaturization of digital products.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
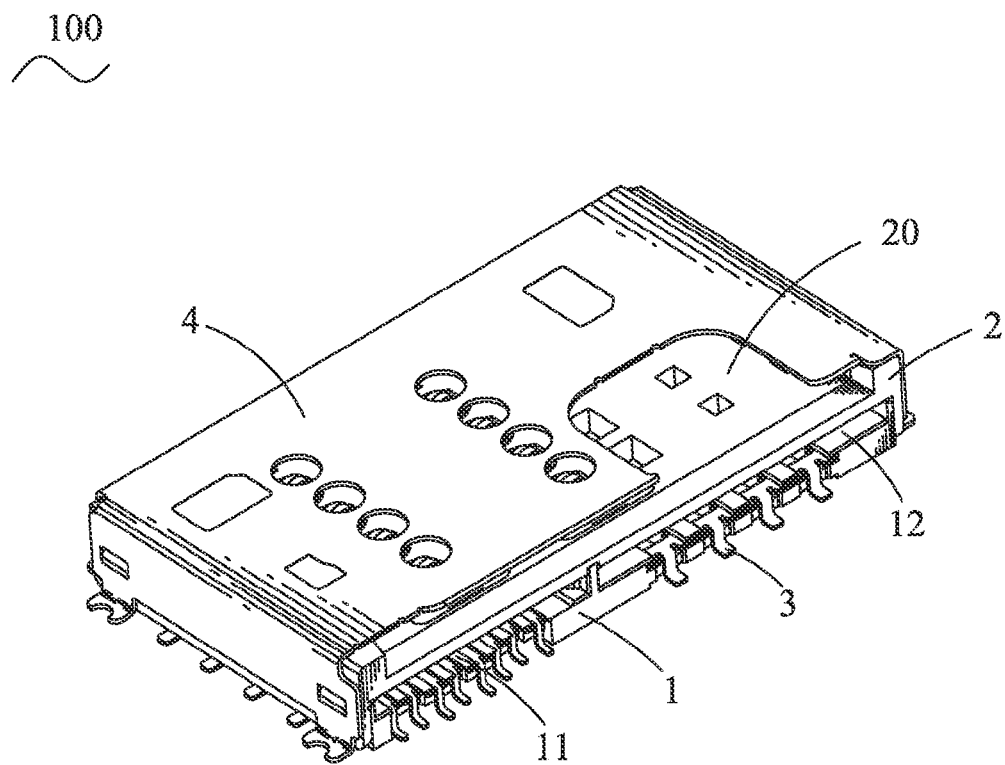
FIG. 1 is an assembled perspective view of a card connector according to the present invention.

Referring to FIG. 1, a card connector 100 according to an embodiment of the present invention is shown. The card connector 100 includes a first insulating housing 1, a second insulating housing 2 mounted above the first insulating housing 1, a plurality of electrical terminals 3 assembled in the first insulating housing 1 and the second insulating housing 2, and a shielding shell 4 enclosing the first and the second insulating housings 1, 2 together with the electrical terminals 3. The first insulating housing 1 defines a first receiving room 11 and a second receiving room 12, and the second insulating housing 2 defines a third receiving room 20, for receiving an electronic card (not shown) therein, respectively. The electronic card is located in the first receiving room 11 and the second receiving room 12 longitudinally, and located in the third receiving room 20 transversely. In this embodiment, the first receiving room 11 and the third receiving room 20 are opened for receiving a micro SIM card and a standard SIM card respectively, and the second receiving room 12 is opened for receiving a SD card therein.

Figure 2:
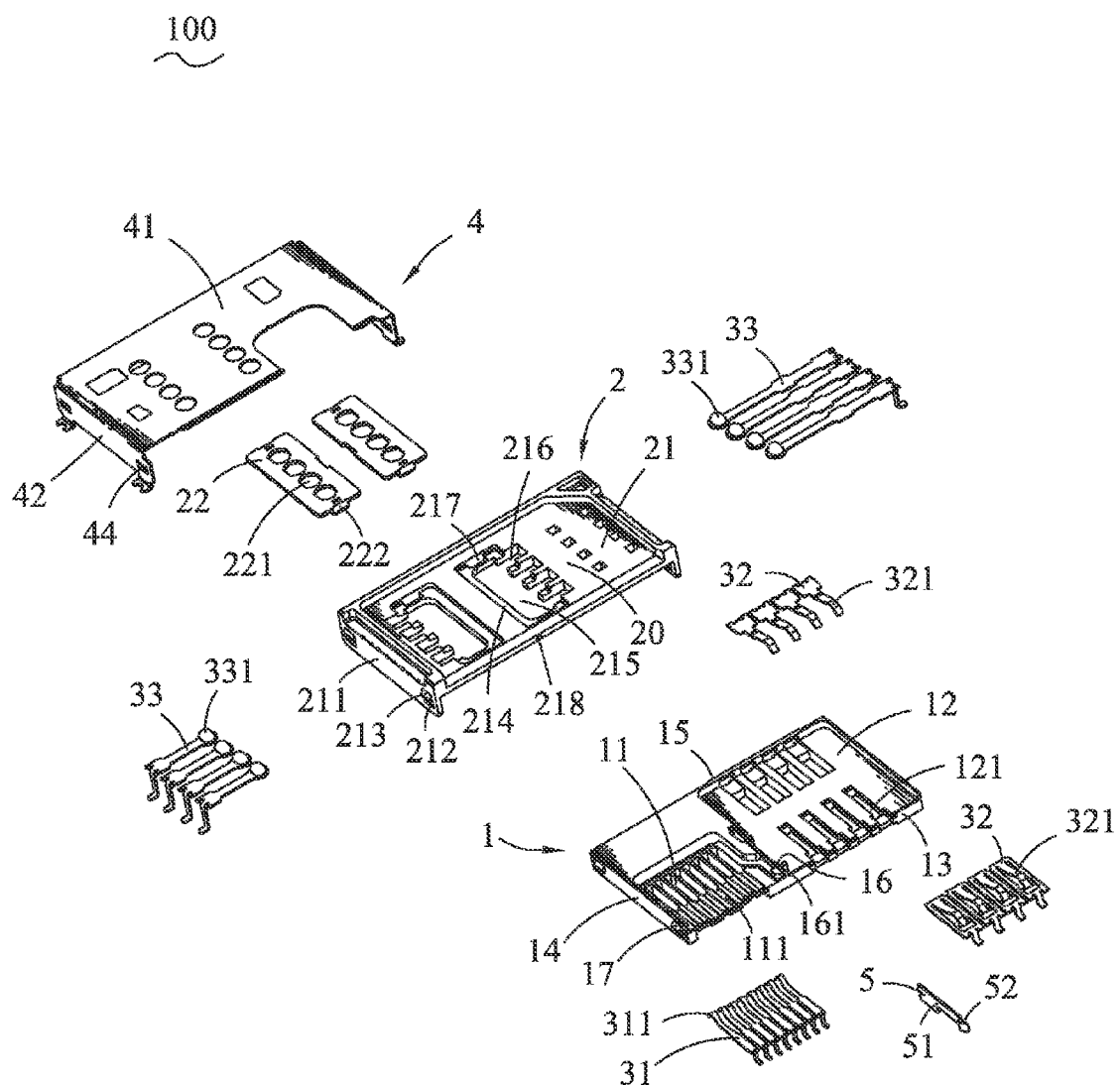
FIG. 2 is an exploded perspective view of the card connector of FIG. 1.
Figure 3:
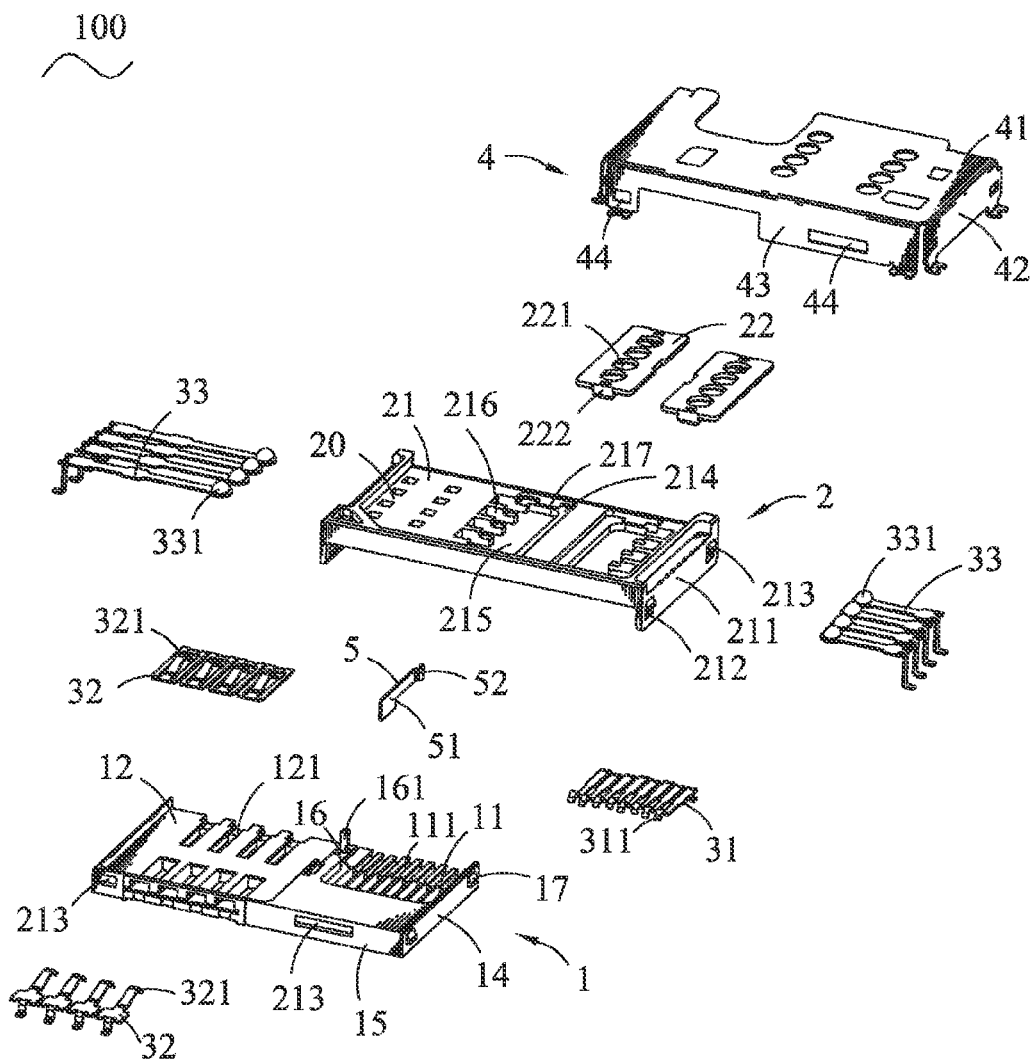
FIG. 3 is an exploded perspective view of the card connector of FIG. 1 viewed from another angle.

With reference to FIGS. 2-3, the first insulating housing 1 has a front surface 13, two opposite lateral surfaces 14 and a rear surface 15, with the first receiving room 11 and the second receiving room 12 abreast opened in a top thereof along the transverse direction and each penetrating through the front surface 13. The first insulating housing 1 defines a plurality of first terminal grooves 111 and second terminal grooves 121 arranged in the first receiving room 11 and the second receiving room 12 respectively.

Referring to FIGS. 2-3, the second insulating housing 2 has the third receiving room 20 transversely opened in a top thereof and penetrating through a front thereof, and at least one receiving cavity 215 opened in a bottom thereof. A pair of side walls 211 protrudes downward at two opposite ends of the second insulating housing 2. The second insulating housing 2 defines a plurality of through holes 221 each vertically penetrating therethrough to connect between the receiving cavity 215 and the third receiving room 20. Two opposite longitudinal sidewalls of the receiving cavity 215 are transversely concaved towards the corresponding side walls 211 to form a plurality of positioning passages 216. In this embodiment, the second insulating housing 2 includes a base 21 and at least one cover board 22, the third receiving room 20 is opened in the top of the base 21 and the receiving cavity 215 is opened in the bottom of the base 21, the receiving cavity 215 penetrates upward through the base 21 to communicate with the third receiving room 20 and then is further spread around to form a locating cavity 214, the cover board 22 is located in the locating cavity 214, and the through holes 221 are opened in the cover board 22 and vertically penetrate through the cover board 22. The front and rear ends of the cover board 22 protrude downward to form two fastening ears 222, and a pair of fastening fillisters 217 is accordingly opened in a bottom sidewall of the locating cavity 214 for fastening the corresponding fastening ears 222 of the cover board 22 therein to secure the cover board 22 and the base 21 together.

Referring to FIGS. 1-3, the electrical terminals 3 include a plurality of first terminals 31 each assembled in the corresponding first terminal groove 111 with a contact portion 311 thereof elastically projecting upward in the first receiving room 11, a plurality of second terminals 32 each assembled in the corresponding second terminal groove 121 with a contact arm 321 thereof elastically projecting upward in the second receiving room 12, and a plurality of third terminals 33 each disposed in the second insulating housing 2 with a touching portion 331 thereof stretching in the receiving cavity 215 and further projecting into the third receiving room 20 through the corresponding through hole 221. A portion of each third terminal 33 connecting with the touching portion 331 is positioned in the corresponding positioning passage 216. In this embodiment, the third terminals 33 are insert-molded in the base 21.

Referring to FIGS. 2-3, the shielding shell 4 has a top plate 41, two side plates 42 bending downward from two opposite ends of the top plate 41, and a rear plate 43 bending downward from a rear edge of the top plate 41. The second insulating housing 2 is covered on the first insulating housing 1 by the side walls 211 clamping the first insulating housing 1 therebetween to make the third receiving room 20 located over the first and the second receiving rooms 11, 12, the shielding shell 4 encloses the first and the second insulating housings 1, 2.

Referring to FIGS. 2-3, the lateral surfaces 14 of the first insulating housing 1 protrude outward to form a plurality of buckle wedges 17, and accordingly, the side walls 211 of the second insulating housing 2 define a plurality of buckle openings 212 for buckling the buckle wedges 17 therein respectively. The rear surface 15 of the first insulating housing 1 and the side walls 211 of the second insulating housing 2 protrude outward to form a plurality of locking bumps 213, and accordingly, the side plates 42 and the rear plate 43 of the shielding shell 4 define a plurality of locking openings 44 for buckling the locking bumps 213 therein respectively. The first insulating housing 1 further defines an inserting slot 16 between the first receiving room 11 and the second receiving room 12. The card connector 100 further includes an elastic terminal 5 which has an inserting slice 51 inserted in the inserting slot 16, and an elastic arm 52 extending forward from a top of a front edge of the inserting slice 51 with a free end arched into the first receiving room 11 for restraining the micro SIM card in the first receiving room 11. A front end of a part of the first insulating housing 1 between the first receiving room 11 and the second receiving room 12 protrudes upward to form a propping pillar 161, and a front edge of the second insulating housing 2 defines a positioning gap 218 according to the propping pillar 161 and further spread to the bottom of the second insulating housing 2 for positioning a top of the propping pillar 161 therein.

As described above, the first receiving room 11 and the second receiving room 12 are abreast opened in the top of the first insulating housing 1 along the transverse direction, and the third receiving room 20 is transversely opened in the top of the second insulating housing 2 and located over the first receiving room 11 and the second receiving room 12, so the card connector 100 forms a structure combining a juxtaposition arrangement and a stratiform arrangement for the receiving rooms to reduce the space occupied by the card connector 100 on an external circuit board. Such structure contributes to the miniaturization of digital products.

What is claimed is:

1. A card connector, comprising:
   a first insulating housing with a first receiving room and a second receiving room being abreast opened in a top thereof along a transverse direction and each penetrating through a front surface thereof, the first insulating housing defining a plurality of first terminal grooves and second terminal grooves arranged in the first receiving room and the second receiving room respectively;
   a second insulating housing with a third receiving room being transversely opened in a top thereof and penetrating through a front thereof, and at least one receiving cavity being opened in a bottom thereof, a pair of side walls protruding downward at two opposite ends of the second insulating housing, the second insulating housing defining a plurality of through holes each vertically penetrating therethrough to connect between the receiving cavity and the third receiving room, two opposite longitudinal sidewalls of the receiving cavity being transversely concaved towards the corresponding side walls to form a plurality of positioning passages;
   a plurality of electrical terminals including a plurality of first terminals each assembled in the corresponding first terminal groove with a contact portion thereof elastically projecting upward in the first receiving room, a plurality of second terminals each assembled in the corresponding second terminal groove with a contact arm thereof elastically projecting upward in the second receiving room, and a plurality of third terminals each disposed in the second insulating housing with a touching portion thereof stretching in the receiving cavity and further projecting into the third receiving room through the corresponding through hole, a portion of each third terminal which connects with the touching portion being positioned in the corresponding positioning passage; and
   a shielding shell, after the second insulating housing is covered on the first insulating housing by the side walls clamping the first insulating housing therebetween to make the third receiving room located over the first and the second receiving rooms, the shielding shell enclosing the first and the second insulating housings.

2. The card connector as claimed in claim 1, wherein two opposite lateral surfaces of the first insulating housing protrude outward to form a plurality of buckle wedges, the side walls of the second insulating housing define a plurality of buckle openings for buckling the buckle wedges therein respectively, a rear surface of the first insulating housing and the side walls of the second insulating housing protrude outward to form a plurality of locking bumps, the shielding shell has a top plate, two side plates bending downward from two opposite ends of the top plate, and a rear plate bending downward from a rear edge of the top plate, the side plates and the rear plate of the shielding shell define a plurality of locking openings for buckling the locking bumps therein respectively.

3. The card connector as claimed in claim 1, wherein the second insulating housing includes a base and at least one cover board, the third receiving room is opened in the top of the base and the receiving cavity is opened in the bottom of the base, the receiving cavity penetrates upward through the base to communicate with the third receiving room and then is further spread around to form a locating cavity, the cover board is located in the locating cavity, and the through holes are opened in the cover board and vertically penetrate through the cover board.

4. The card connector as claimed in claim 3, wherein the third terminals are insert-molded in the base, front and rear ends of the cover board protrude downward to form two fastening ears, a pair of fastening fillisters is accordingly opened in a bottom sidewall of the locating cavity for fastening the corresponding fastening ears of the cover board therein to secure the cover board and the base together.

5. The card connector as claimed in claim 1, wherein the first insulating housing defines an inserting slot between the first receiving room and the second receiving room, the card connector further includes an elastic terminal which has an inserting slice inserted in the inserting lost, and an elastic arm extending forward from a top of a front edge of the inserting slice with a free end arched into the first receiving room.

6. The card connector as claimed in claim 1, wherein a front end of a part of the first insulating housing between the first receiving room and the second receiving room protrudes upward to form a propping pillar, a front edge of the second insulating housing defines a positioning gap according to the propping pillar and further spread to the bottom of the second insulating housing for positioning a top of the propping pillar therein.

\* \* \* \* \*